United States Patent [19]
Fukuta

[11] Patent Number: 5,894,545
[45] Date of Patent: Apr. 13, 1999

[54] IMAGE PROCESSING METHOD AND APPARATUS

[75] Inventor: Shigenori Fukuta, Kawaguchi, Japan

[73] Assignee: Canon Kabushiki Kaisha, Tokyo, Japan

[21] Appl. No.: 08/780,003

[22] Filed: Dec. 23, 1996

[30] Foreign Application Priority Data

Dec. 27, 1995 [JP] Japan .................................. 7-341037

[51] Int. Cl.⁶ .................................................. G06K 15/00
[52] U.S. Cl. .................................................. 395/115; 395/112
[58] Field of Search ................................. 395/101, 112, 395/113, 114, 115, 116, 821, 825, 826, 827, 834, 837, 872, 874, 876, 877, 894, 200.64, 309, 733; 340/825.8; 370/394–395, 414, 429, 412, 418, 902

[56] References Cited

U.S. PATENT DOCUMENTS

| | | | |
|---|---|---|---|
| 4,937,681 | 6/1990 | Fujinawa et al. | 358/426 |
| 5,740,028 | 4/1998 | Sugiyama et al. | 364/130 |

*Primary Examiner*—Arthur G. Evans
*Attorney, Agent, or Firm*—Fitzpatrick, Cella, Harper & Scinto

[57] ABSTRACT

An image processor includes a compressor which compresses input image information, with the compressed input image information being stored in a storage device. The image processor also includes a processor that processes the stored compressed image information, and a development unit which develops the processed compressed image data into individual pixels.

36 Claims, 11 Drawing Sheets

IMAGE PROCESSING METHOD AND APPARATUS

BACKGROUND OF THE INVENTION

1. Field of the Invention

The present invention relates to an image processing method whereby data that are recorded using a page description language (hereinafter referred to as a "PDL") are received and an image that is described by the PDL data is reproduced, and also to an image processing apparatus and an image processing system therefor.

2. Related Background Art

Recently, a system has become available that provides for the receipt and translation of PDL data output and transmitted across a network by a host computer, and the use of the resultant data for an image reproduced on paper or for an image projected by an OHP.

Image processing apparatuses for employment with such systems can be connected to a plurality of network host computers, and to color copiers for printing, since color copiers that produce high quality images are increasingly being employed as network printers. In addition, since almost all image processing apparatuses that are available on the market include a spooling function, a system has been proposed whereby the work required of a user employing an image processing apparatus (printer) is reduced and the equipment usability is enhanced.

Conventionally, however, a storage device (hard disk, etc.) having a large memory capacity is required to spool a large quantity of image data, and accordingly, the cost is increased. Especially for spooling color image data, an enormous memory capacity is required, and even a 1 GB hard disk is immediately filled, which is not at all practical. Since recently the trend is to employ higher resolutions, many 600 dpi or 1200 dpi image processing apparatuses (printers) are being sold, and storage devices, such as hard disks, having large capacities have become necessary.

SUMMARY OF THE INVENTION

It is, therefore, one object of the present invention to provide an image processing method whereby a job file is compressed and the compressed data are stored in a storage device, such as a hard disk, so that a large quantity of high resolution image data can be spooled using a hard disk having a small memory capacity, and to provide an image processing apparatus and an image processing system therefor.

To achieve the above object, according to a first aspect of the present invention, provided are an image processing apparatus, and an image processing method comprising:

- a compression step of compressing input image information;
- a storage step of storing compressed image information in first storage means;
- a processing step of processing the compressed image information stored in the first storage means; and
- a development step of developing the compressed image information into image data for individual pixels.

Further, to achieve the above object, according to a second aspect of the present invention, provided are an image processing apparatus, and an image processing method comprising:

- a storage step of storing input image information in first storage means;
- a measurement step of measuring a time that has elapsed following the storage of the image information in the first storage means;
- a compression step of compressing the image information stored in the first storage means when a specified time has elapsed at the measurement step;
- a processing step of processing compressed image information stored in the first storage means; and
- a development step of developing the compressed image information into image data for individual pixels.

To achieve the above object, according to a third aspect of the present invention, provided are an image processing apparatus, and an image processing method comprising:

- an input step of inputting image information;
- an examination step of examining the image information that is input;
- a compression step of compressing the image information in consonance with a result obtained at the examination step;
- a storage step of storing compressed image information in first storage means; and
- a processing step of processing compressed image information stored in the first storage means.

DETAILED DESCRIPTION OF THE PREFERRED EMBODIMENTS

The present invention will now be described in detail while referring to the preferred embodiments.

Although in the embodiments a system wherein a color copier and an image processing apparatus are arranged is employed as an example application of the present invention, the present invention is not limited to this system and can be applied for various use with other apparatuses.

[First Embodiment]

Figure 3:
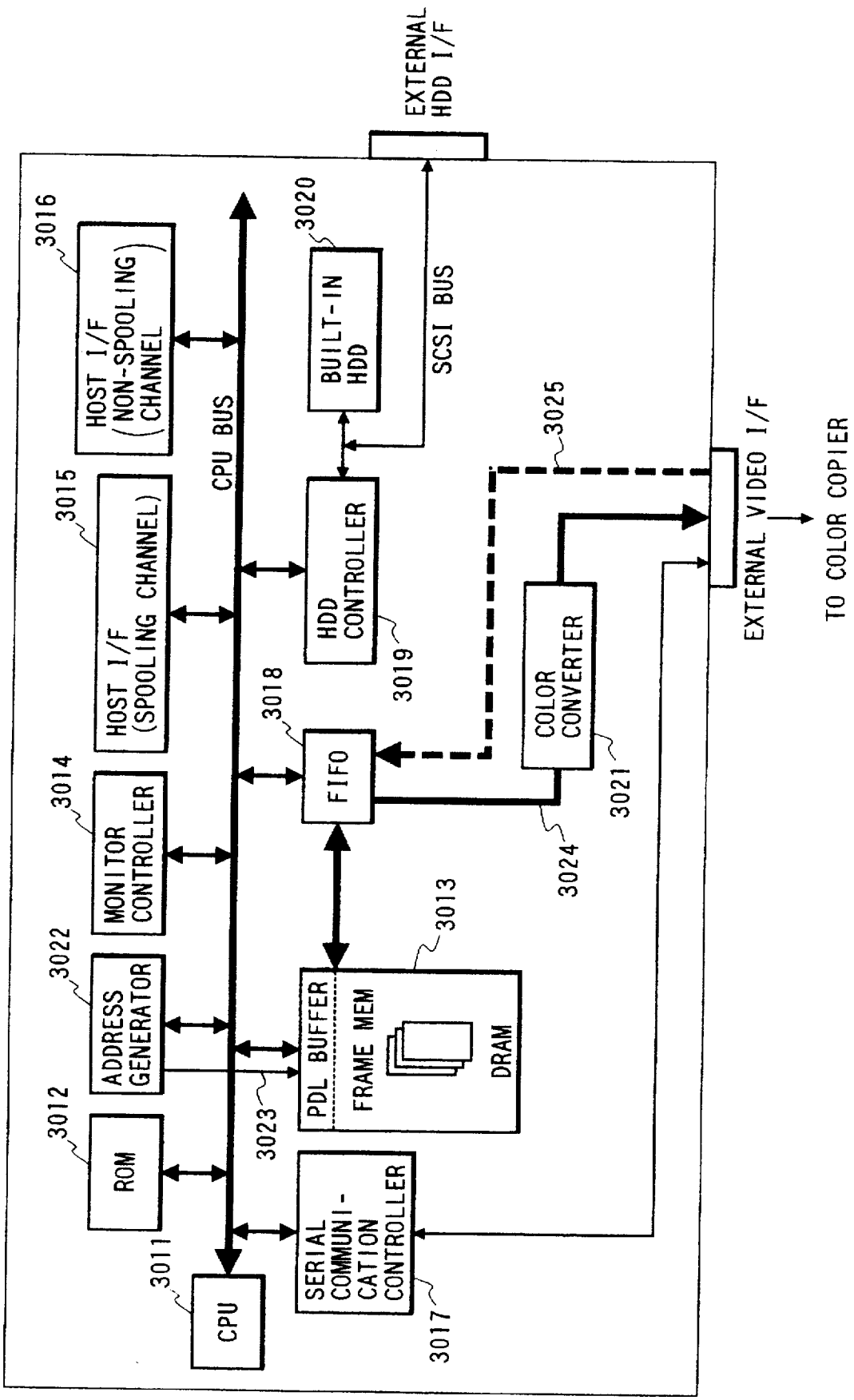
FIG. 3 is an internal block diagram illustrating an image processing apparatus according to the first embodiment.

FIG. 3 is a diagram illustrating the configuration of an image processing system according to a first embodiment of the present invention.

Figure 1:
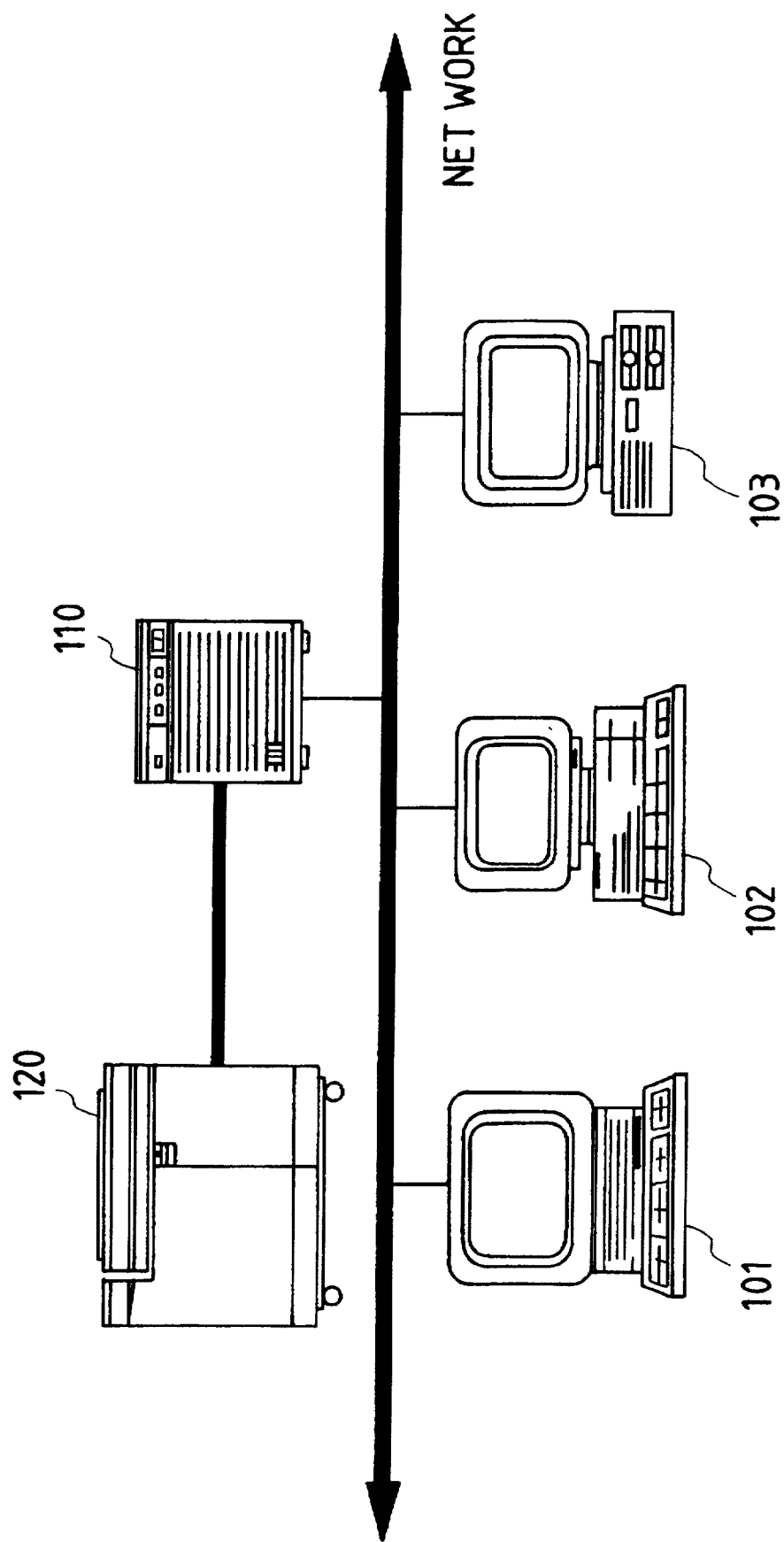
FIG. 1 is a diagram illustrating an image processing and forming system configuration according to a first embodiment of the present invention.

As is shown in FIG. 1, provided in this embodiment are a digital color copier 120, which includes an image reader and a digital image print unit for printing color digital images and gray scale digital images; an image processing apparatus 110 that is connected to a network 1; and client user computers 101, 102 and 103.

First, the color copier will be described in detail.

[Outline of the apparatus]

Figure 2:
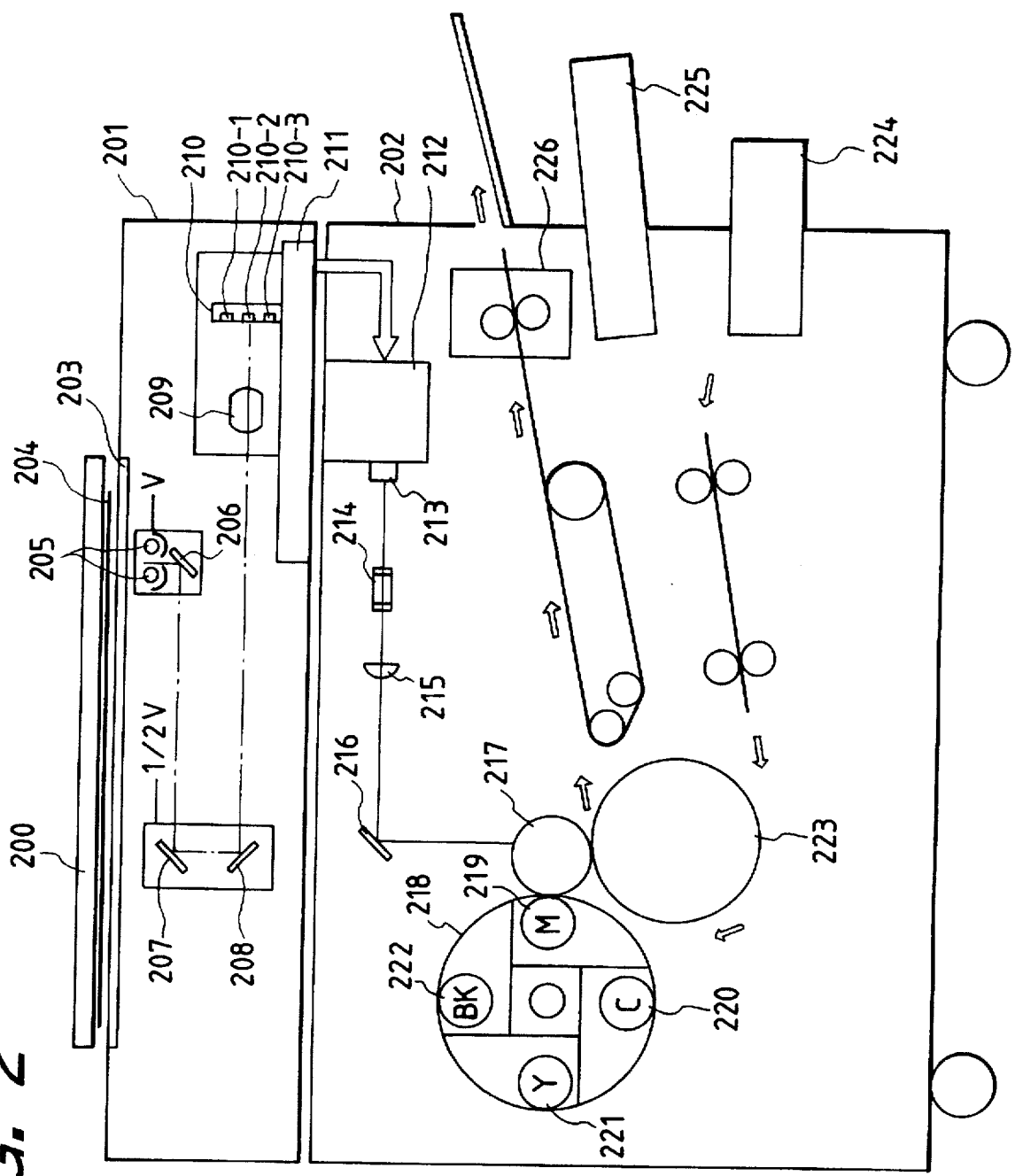
FIG. 2 is an internal block diagram illustrating a color copier according to the first embodiment.

FIG. 2 is a schematic diagram illustrating the apparatus according to the first embodiment of the present invention. An image scanner 201 reads an original document at 400 dpi (dots/inch), and performs digital signal processing. A printer 202 prints a full color image, which corresponds to the document image read by the image scanner 201 on paper at a resolution of 400 dpi.

In the image scanner 201, an original document 204, which is placed on a document glass plate (hereinafter referred to as a platen) under a mirror-faced pressure plate 200, is irradiated by lamps 205. A reflected beam is guided to mirrors 206, 207 and 208, and is split into three beams by a lens 209. The split beams then impinge on a three-line sensor (hereinafter referred to as a CCD) 210 to form images, which are transmitted to a signal processor 211 as red (R), green (G) and blue (B) components for full color information. The entire surface of the original document is scanned (sub-scanned) by mechanically moving the lamps 205 and the mirror 206 at velocity v and the mirrors 207 and 208 at a velocity of ½ v perpendicular to the electric scan (main scan) direction of the line sensor 210.

The signal processor 211 electrically separates an image signal that has been read into magenta (M), cyan (C), yellow (Y) and black (Bk) components, and transmits these components to the printer 202. Each time the image scanner 201 scans the original document, one of the components, M, C, Y or Bk, is transmitted to the printer 202. Thus, four scannings are performed for each printing of the original document.

The image signals M, C, Y and Bk from the image scanner 201 are sent to a laser driver 212. In response to the received image signal, the laser driver 212 drives a semiconductor laser 213 for modulation. A laser beam passes through a polygon mirror 214, an fθ lens 215, and a mirror 216 to scan a photosensitive drum 217.

A rotary developer 218 is constituted by a magenta developing section 219, a cyan developing section 220, a yellow developing section 221, and a black developing section 222. The four developing sections alternately contact the photosensitive drum 217 and develop an electrostatic image on the photosensitive drum 217 formed with toner.

A sheet of paper that is fed from a paper cassette 224 or 225 is wrapped around a transfer drum 223, and the image that is developed on the photosensitive drum 217 is transferred to the sheet.

After images for the four colors M, C, Y and Bk have sequentially been transferred in this manner, the sheet is passed through a fixing unit 226, whereat the toner is fixed to the sheet, and is discharged.

[Host computer]

Figure 4:
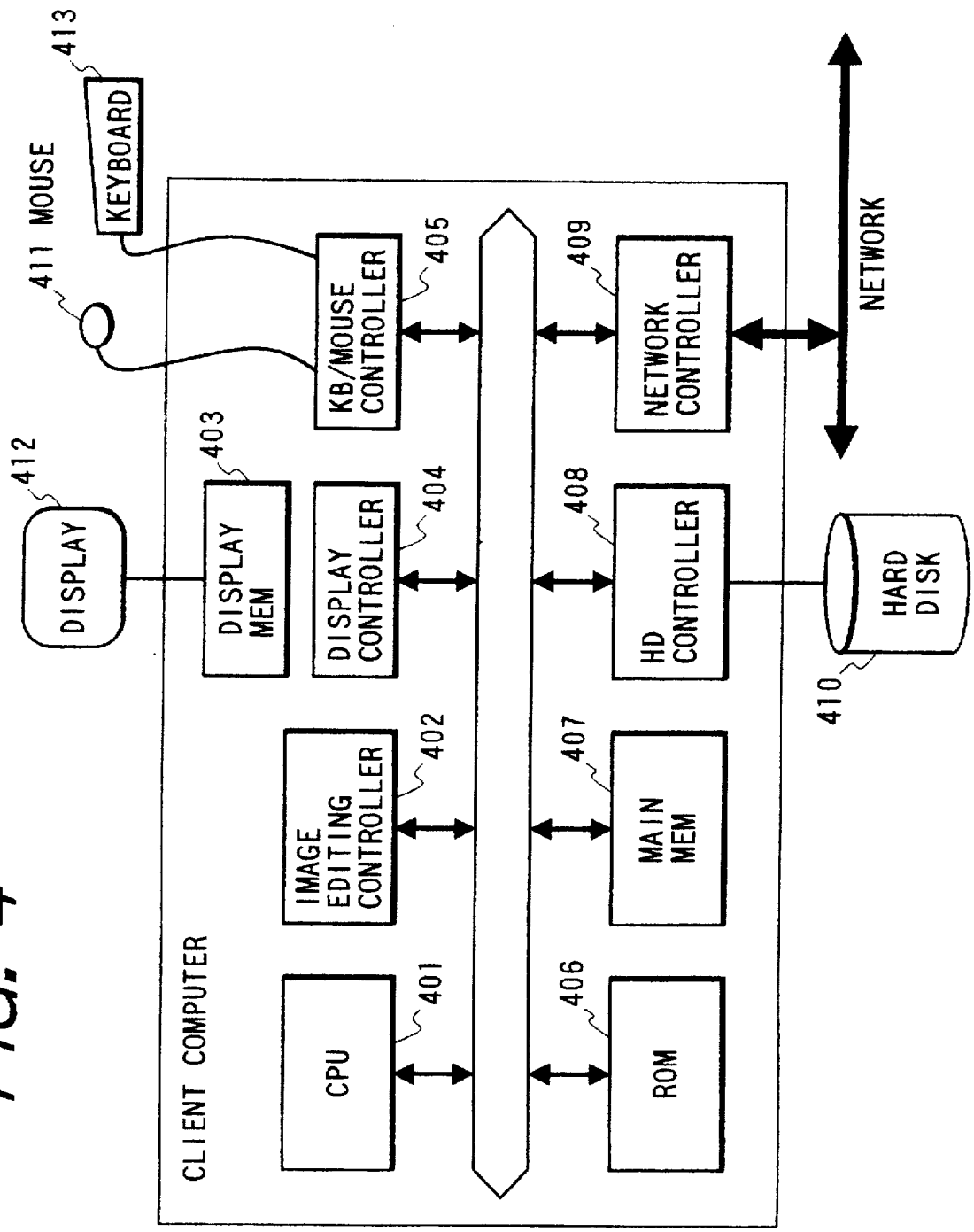
FIG. 4 is an internal block diagram illustrating a host computer according to the first embodiment.

FIG. 4 is a diagram illustrating the arrangement of one of the client computers 101 through 103 on the network 1.

The client computer comprises: a network controller 409 for controlling the protocol of the network 1; a CPU 401 for performing the central processing of the client computer in accordance with a program stored in a ROM 406 or on a hard disk 410; the hard disk 410 on which image data are temporarily registered and various other data are stored; a hard disk controller 408 for controlling the hard disk 410; a main memory 407; a mouse 411 and a keyboard 413 serving as an operator instruction input means; a keyboard/mouse controller 405 for controlling these means; a color display 412 for displaying a layout and an editing menu; a display memory 403; a display controller 404, and an image editing controller 402 for performing image layout and image editing in the display memory 403.

[Image processing apparatus]

<Output to color copier>

FIG. 3 is an internal block diagram illustrating the image processing apparatus 110.

In FIG. 3, a program, which is defined by a flowchart that will be described later, is stored in a ROM 3012. A CPU 3011 employs the program stored in the ROM 3012 to control the entire image processing apparatus across a CPU bus. A high speed processing CPU, such as a RISC, is employed as the CPU 3011 because it must develop images defined in page description languages (e.g., PostScript). A monitor controller 3014 controls the monitoring of jobs for a spooler to support a spooling function. A serial I/F 3015, a parallel I/F 3016, or a LAN (serial communication) controller 3017 receives PDL data from the host computer. Although at this time image data from the host computer are transmitted via a serial I/F, a parallel I/F, or a LAN I/F, a cable can be connected at the same time. When a request is received from the host computer, the interfaces are automatically switched. The host interface 3015 for a spooling channel receives PDL data from the host computer and temporarily stores them in a specific area on an HDD 3020 built into the image processing apparatus or in another storage means, such as an external HDD. As a result, the work required of a user when employing an image processing apparatus (printer) is reduced, and the equipment usability is improved. The thus received PDL data (including the PDL data temporarily stored on the HDD in the image processing apparatus) are stored, via the CPU bus, in an area (a PDL buffer) in a DRAM 3013. The CPU 3011 employs font data that are stored in the ROM 3012, on the built-in HDD 3020, or on an external HDD, and develops the PDL data in the partial area of the DRAM 3013 to obtain a raster image data (red, green and blue). An address generator 3022 then generates a write address 3023 for each frame memory and stores the raster image data in specific areas (frame memories) of the DRAM 3013. A program, which is defined by a flowchart that will be described later, is stored in the ROM 3012, and the CPU 3011 is the primary component to execute that program. The color copier (see FIG. 2) in this embodiment is a color electrophotographic copier that sequentially forms images for a plurality of color components, cyan, magenta, yellow and black. The raster image data are temporarily stored in an FIFO buffer 3018 so that the image data can be synchronously read in consonance with a synchronization signal (not shown) emitted by the above color copier 120. The raster image data are transferred from the FIFO buffer 3018 to a color converter 3021 for color conversion. That is, the red, green and blue raster image data are changed to cyan, magenta, yellow and black raster image data that can be printed by the color copier (see FIG. 2). Following this, the raster image data are transmitted to an external video I/F, and, depending on the signal, image forming is performed by the image forming unit of the color copier.

Figure 5:
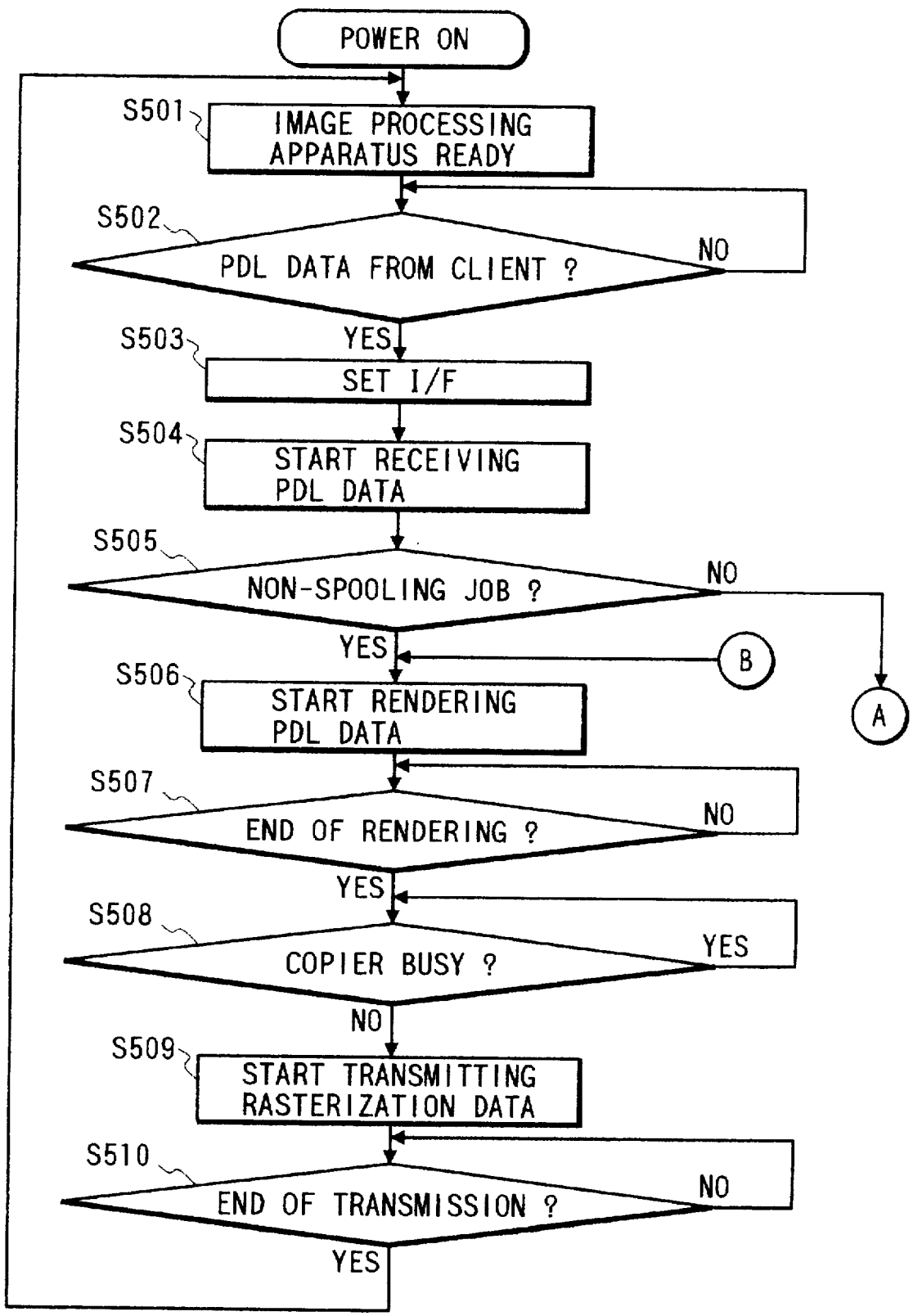
FIG. 5 is a flowchart for explaining the control exercised by the image processing apparatus according to the first embodiment.
Figure 6:
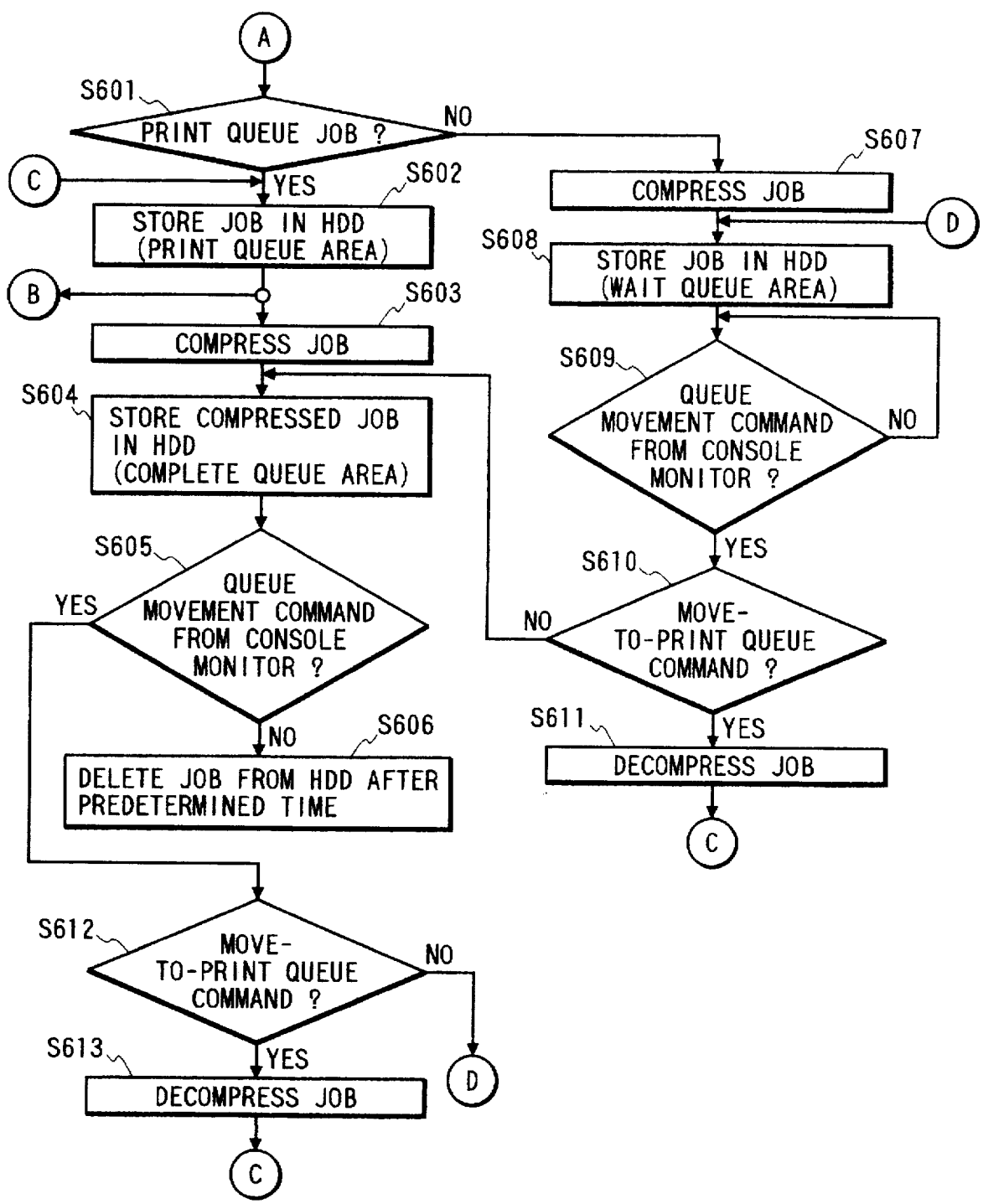
FIG. 6 is a flowchart for explaining the control exercised by the image processing apparatus according to the first embodiment.

FIGS. 5 and 6 are flowcharts of the control program for the CPU 3011 in the image processing apparatus 110 according to this embodiment. First, at step S501 the image processing apparatus is determined to be ready, at step S502, a check is performed to determine whether or not PDL data are to be transmitted by a client host computer; if so, the image processing apparatus 110 waits until the PDL data are transmitted. When the PDL data from the host computer are received, the interface to which the data are not transmitted is set to busy to inhibit the acceptance of data at that interface, and transmission of a notice to that effect is performed (S503). At step S504, reception of the PDL data is begun. It is preferable that the PDL data be received as units, such as sets of several bytes or several bands, that are appropriate for the image forming process in the color copier. At step S505, a check is performed to determine whether or not the received PDL data are for a job for a non-spooling channel (directly connected without passing through a spooler). If the PDL data are for a non-spooling job, rasterization (rendering) of the PDL data received at steps S506 and S507 is performed, and the resultant data are written into the image memory in the image processing apparatus. The image memory can be either the DRAM 3013, which has a short access time, or the built-in HDD 3020, which has a longer access time but provides a large memory capacity at a lower cost. The selection of the image memory depends on the overall performance of the system and the capacity of the DRAM or the installed disk. At step S508, by serial communication between the image processing apparatus 110 and the color copier 120, a check is performed to determine whether or not the copier 120 is busy. If the color copier 120 is not busy, the raster image data that have been developed in the image memory are read and transferred to the color copier 120 (S509), and the color copier 120 forms an image for one page. If the color copier 120 is busy, the image processing apparatus 110 waits until the copier 120 is ready. When it is confirmed that the copier 120 is ready, the raster image data are transferred thereto. After the raster image data have been transferred, the image processing apparatus 110 is shifted to the ready state (S501), placed on standby for the receipt of PDL data.

When, at step S505, the PDL data received are not for a non-spooling job, i.e., are for a job employing a spooler, at step S601 in FIG. 6, a check is performed to determine whether or not the PDL data are for a print queue job. If the PDL data are for a print queue job, at step S602 program control moves to B and to step S506 in FIG. 5, whereat the job is temporarily stored in an area, on the HDD 3020 of the image processing apparatus 110, that is allocated for a print queue. At steps S506 through S510 in FIG. 5, rasterization of the PDL data read from the HDD 3020 is performed; the state of the color copier 120 is checked to determine whether it is busy; the raster image data are transferred to the copier 120; and an image for one page is formed by the color copier 120. When the raster image data have been transferred, the image processing apparatus 110 is shifted to the ready state (S501) to wait for PDL data.

At the same time that program control moves from step S602 to B for the performance of the printing process at steps S506 through S510, program control moves to step S603. At step S603, the PDL data are compressed and at step S604, the compressed data are stored in an area, on the HDD 3020 in the image processing apparatus 110, that is allocated for a complete queue. Following this, at step S605, a check is performed to determine whether or not a queue movement command has been issued by console monitor means, which may issue a command for monitoring a spooled job or for performing a queue movement. If no queue movement command has been issued by the console monitor means, at step S606 the job is deleted after a predetermined time has elapsed. This predetermined time is a parameter that a user can arbitrarily set in accordance with available information, such as the capacity of the built-in HDD 3020. When a queue movement command has been issued, at step S612 a check is performed to determine whether or not the command is a move-to-print queue command. If it is, at step S613 the PDL data are decompressed. Then, as is indicated by C, program control returns to step S602, whereat the job is temporarily stored in the area, on the HDD 3020 of the image processing apparatus 110, that is allocated for a print queue; rasterization of the PDL data stored on the HDD 3020 is performed; and an image is formed by the color copier 120. The succeeding processing is the same as is described above. When, at step S612, the command is not a move-to-print queue command, the processing at step S608 and the following steps, which will be described later, is performed.

When, at step S601, the job is not a print queue job, i.e., a wait queue job, program control advances to step S607. At step S607, the PDL data are compressed, and at step S608, the compressed data are stored in an area, on the HDD 3020 of the image processing apparatus 110, that is allocated for a wait queue. Subsequently, at step S609, a check is performed to determine whether or not a queue movement command has been issued by the console monitor means, which may issue a command for monitoring a spooled job or for performing a queue movement. If a queue movement command has been issued, at step S610 a check is performed to determine whether or not the command is a move-to-print queue command. If the command is a move-to-print queue command, at step S611, the compressed PDL data are decompressed. The job is then temporarily stored in the area, on the HDD 3020 of the image processing apparatus 110, that is allocated for a print queue, and the above described following processing is performed.

When, at step S610, the command is not a move-to-print queue command, i.e., when it is a move-to-complete queue command, the compressed PDL data are stored in the area, on the HDD 3020 of the image processing apparatus 110, that is allocated for a complete queue, and the processing at step S605 and the following steps are performed.

Figure 7:
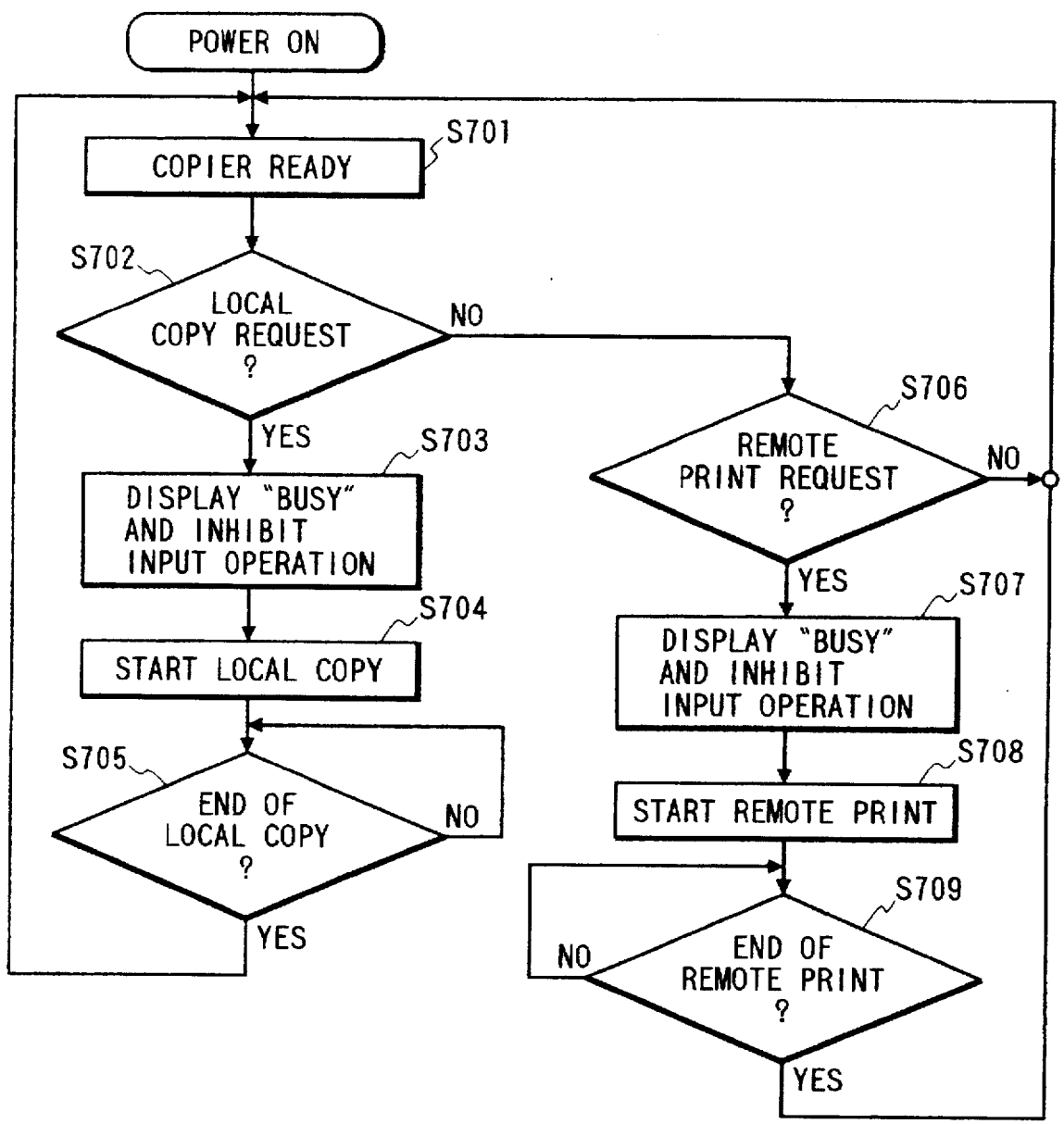
FIG. 7 is a flowchart for explaining the control exercised by the color copier according to the first embodiment.

FIG. 7 is a flowchart for the control of the color copier 120 according to this embodiment. First, at step S702, a check is performed to determine whether or not local copying is requested. When local copying is requested, at step S703 "Busy" is displayed on a console section to inhibit input operation, and at steps S704 and S705, local copying is performed. The color copier 120 is thereafter shifted to the ready state (S701). When, at step S702, there is no local copying request, at step S706 a check is performed to determine whether or not remote printing is requested. If remote printing is requested, at step S707 "Busy" is displayed on the console section to inhibit input operations. At steps S708 and S709, raster data are read from the image memory of the image processing apparatus 110, and image forming is performed for the data. The color copier 120 is thereafter shifted to the ready state (S701).

<Input from color copier>

For local copying, the image data that are read by the scanner of the color copier are transmitted as red, green and blue dot data to the image processing apparatus 110, and are temporarily stored in the FIFO buffer 3018, so that the image data can be read in synchronism with a sync signal (not shown) issued by the image processing apparatus. The image data are then stored in the frame memory 3013 (see FIG. 3) in response to a sync signal. The address generator 3022 generates a read address for image data stored in the frame memory 3013; processing such as thinning is performed on the image data; and the data are then transmitted to the host computer via the parallel interface.

[Second Embodiment]

According to a second embodiment, an image processing apparatus 110 is so designed that a timer is started when a job enters a wait queue, and after a specified period of time has elapsed, only PDL data for which a printing command was not issued are compressed and the compressed data stored on an HDD 3020 (accordingly, all of the job files in a complete queue are compressed). The arrangement of the image processing apparatus 110 is practical because a job file that is frequently used is not compressed when stored on the HDD 3020, so that the job file can be immediately printed without performing the compression/decompression process, and because a job file that is less frequently used is compressed before being stored, so that many job files can be stored on an HDD having a small capacity.

Figure 8:
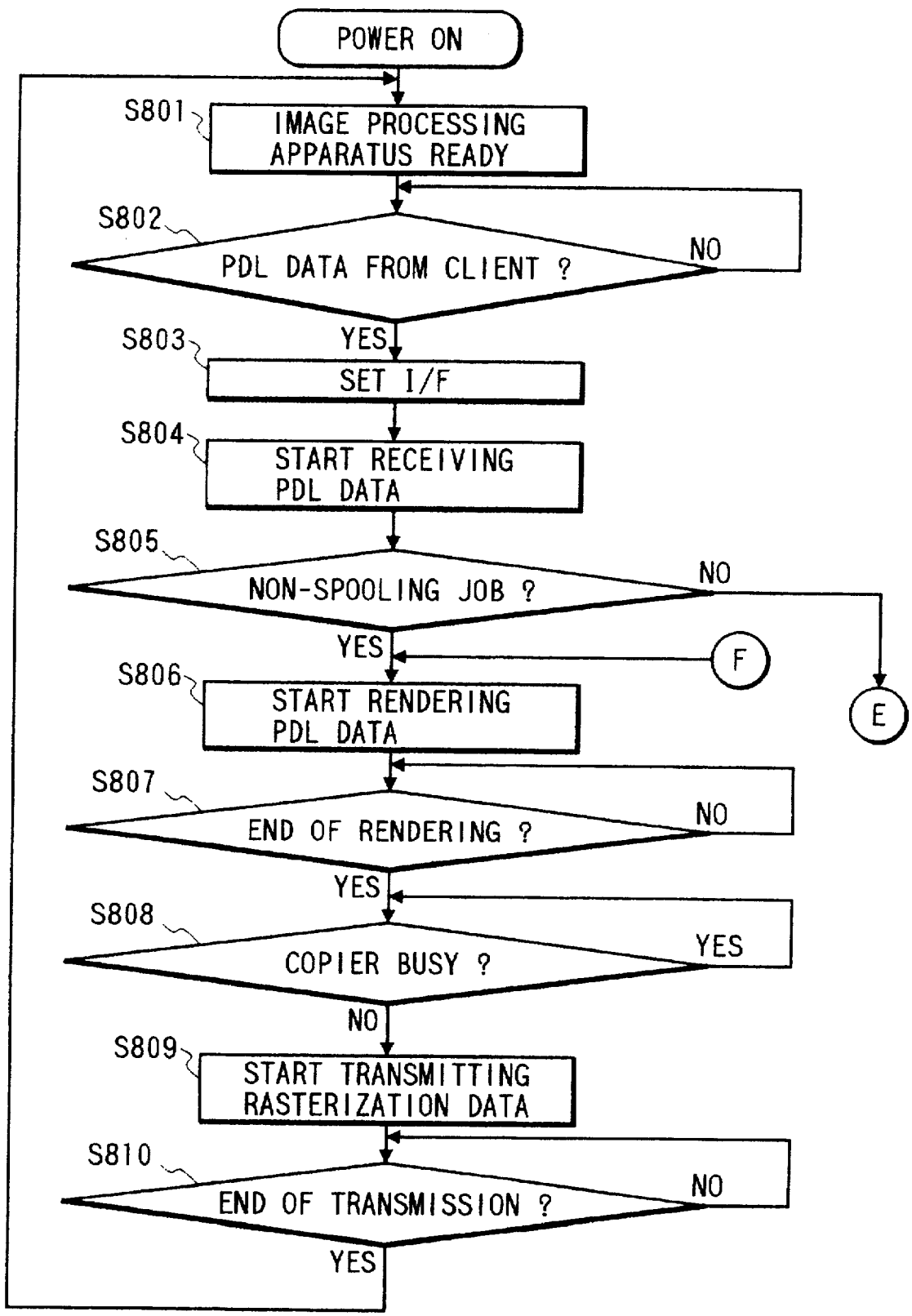
FIG. 8 is a flowchart for explaining the control exercised by an image processing apparatus according to a second embodiment.
Figure 9:
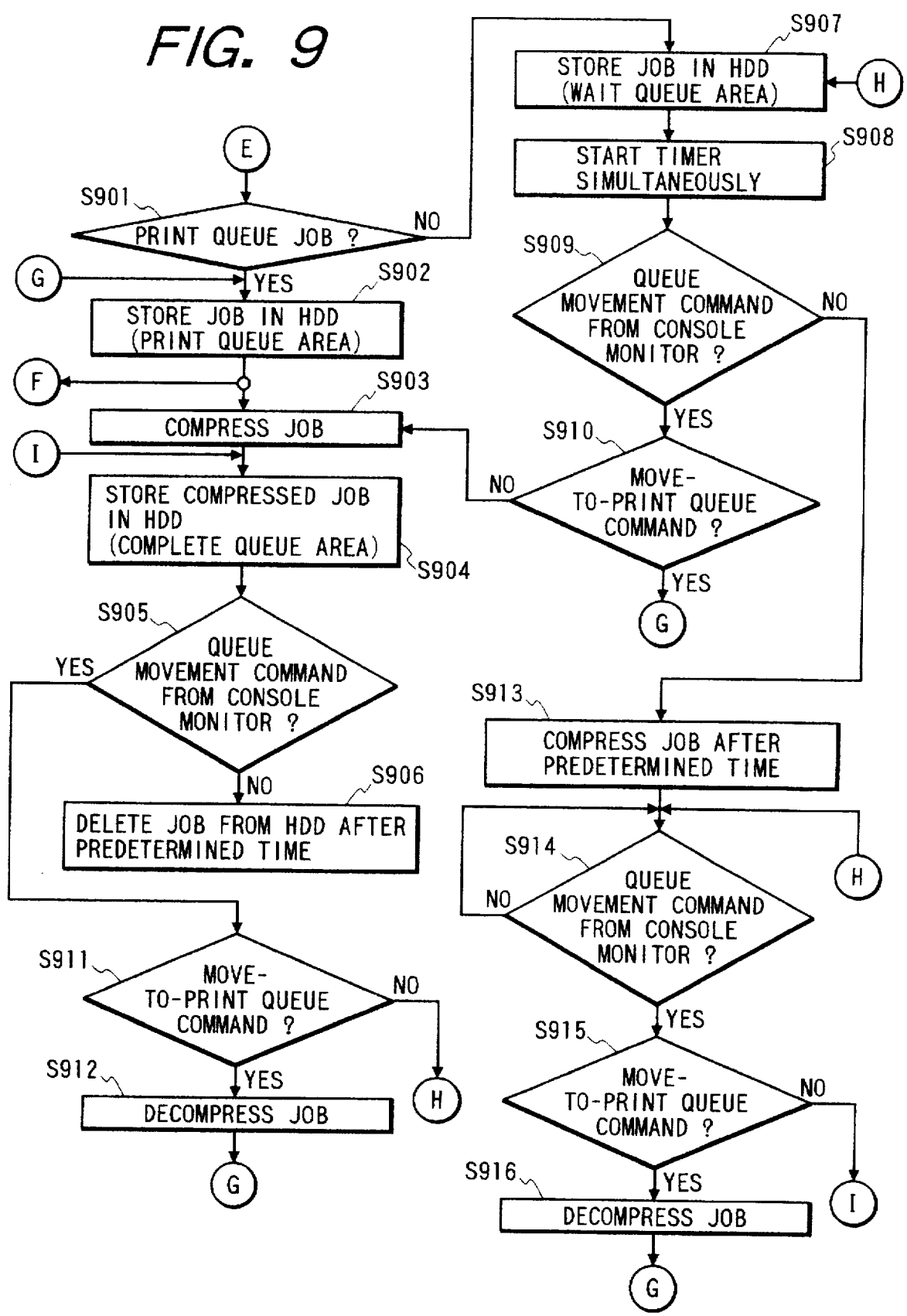
FIG. 9 is a flowchart for explaining the control exercised by the image processing apparatus according to the second embodiment.

FIGS. 8 and 9 are flowcharts of the control program for the image processing apparatus 110 according to this embodiment. First, at step S802, a check is performed to determine whether or not PDL data are to be transmitted from a host computer. If they are, the image processing apparatus 110 waits until the PDL data are received. When the PDL data are received from the host computer, the interface to which the data are not transmitted is set to busy to inhibit the acceptance of data at that interface, and transmission of a notice to that effect is performed (S803). At step S804, reception of the PDL data is begun. It is preferable that the PDL data be received as units, such as sets of several bytes or several bands, that are appropriate for the image forming process in the color copier. At step S805, a check is performed to determine whether or not the received PDL data are for a job for a non-spooling channel (directly connected without passing through a spooler). If the PDL data are for a non-spooling job, rasterization (rendering) of the PDL data received at steps S806 and S807 is performed, and the resultant data are written into the image memory in the image processing apparatus. The image memory can be either the DRAM 3013, which has a short access time, or the built-in HDD 3020, which has a longer access time but provides a large memory capacity at a lower cost. The selection of the image memory depends on the overall performance of the system and the capacity of the DRAM or the installed disk. At step S808, by serial communication between the image processing apparatus 110 and the color copier 120, a check is performed to determine whether or not the copier 120 is busy. If the color copier 120 is not busy, the raster image data that have been developed in the image memory are read and transferred to the color copier 120 (S809), and the color copier 120 forms an image for one page. If the color copier 120 is busy, the image processing apparatus 110 waits until the copier 120 is ready. When it is confirmed that the copier 120 is ready, the raster image data are transferred thereto. After the raster image data have been transferred, the image processing apparatus 110 is shifted to the ready state (S801), placed on standby for the receipt of PDL data.

When, at step S805, the received PDL data are not for a non-spooling job, i.e., are for a job employing a spooler, program control moves to FIG. 9, as is indicated by symbol E. At step S901, a check is performed to determine whether or not the PDL data are for a print queue job. If the PDL data are for a print queue job, at step S902 that job is temporarily stored in an area, on the HDD 3020 of the image processing apparatus 110, that is allocated for a print queue. At steps S806 through S810, rasterization of the PDL data read from the HDD 3020 is performed; the state of the color copier 120 is checked to determine whether it is busy; the raster image data are transferred to the copier 120; and an image for one page is formed by the color copier 120. When the raster image data have been transferred, the image processing apparatus 110 is shifted to the ready state (S801) to wait for PDL data. At this time, while the printing process is being performed at steps S806 through S810, at step S903 the PDL data are compressed, and at step S904 the compressed data are stored in an area, on the HDD 3020 of the image processing apparatus 110, that is allocated for a complete queue. Following this, at step S905, a check is performed to determine whether or not a queue movement command has been issued by console monitor means, which may issue a command for monitoring a spooled job or for performing a queue movement. If no queue movement command has been issued by the console monitor means, at step S906 the job is deleted after a predetermined time has elapsed. This predetermined time is a parameter that a user can arbitrarily set in accordance with available information, such as the capacity of the built-in HDD 3020. When a queue movement command has been issued, at step S911 a check is performed to determine whether or not the command is a move-to-print queue command. If it is, at step S912 the PDL data are decompressed. Then, the decompressed PDL data for the job are temporarily stored in the area, on the HDD 3020 in the image processing apparatus 110, that is allocated for a print queue; rasterization of the PDL data stored on the HDD 3020 is performed; and an image is formed by the color copier 120. The succeeding processing is the same as is described above. When, at step S911, the command is not a move-to-print queue command, the processing at step S914 and the following steps, which will be described later, are performed.

When, at step S901, the job is not a print queue job, i.e., a wait queue job, at step S907 the PDL data are stored in an area, on the HDD 3020 in the image processing apparatus 110, that is allocated for a wait queue. Simultaneously, at step S908, a timer is started to measure the time the job remains in the wait queue. Subsequently, at step S909, a check is performed to determine whether or not a queue movement command has been issued by the console monitor means, which may issue a command for monitoring a spooled job or for performing a queue movement. If a queue movement command has been issued, at step S910 a check is performed to determine whether or not the command is a move-to-print queue command. If the command is a move-to-print queue command, the job is temporarily stored in the area, on the HDD 3020 in the image processing apparatus 110, that is allocated for a print queue. Then, rasterization and the other processing of the PDL data read from the HDD 3020 are performed, and an image is formed by the color copier 120. The succeeding processing is the same as is described above. When, at step S910, the command is not a move-to-print queue command, i.e., when it is a move-to-complete queue command, at step S903 the PDL data are compressed, and at step S904 the compressed PDL data are stored in the area, on the HDD 3020 in the image processing apparatus 110, that is allocated for a complete queue. The processing at step S905 and the following steps is thereafter performed. When, at step S909, no queue movement command has been issued by the console monitor means, at step S903 the job is compressed following the lapse of a predetermined period of time. This period can be arbitrarily set by a user using console means, such as a console monitor, and can be altered as needed. At step S914, a check is performed to determine whether or not a queue movement command has been issued by the console monitor means. When a queue movement command has been issued, at step S915 a check is performed to determine whether or not the command is a move-to-print queue command. If the command is a move-to-print queue command, at step S916 the compressed job is decompressed, and the decompressed job is stored in the area, on the HDD 3020 in the image processing apparatus 110, that is allocated for a print queue. The succeeding processing is thereafter performed as is previously described. If, at step S915, the command is not a move-to-print queue command, i.e., when the command is a move-to-complete queue command, at step S904 the compressed data are stored in the area, on the HDD 3020 in the image processing apparatus 110, that is allocated for a complete queue. The processing at step S905 and the following steps are thereafter performed.

[Third Embodiment]

According to a third embodiment, an image processing apparatus is so designed that the size of a PDL data file is examined when a job enters a wait queue, and the PDL data are compressed in consonance with the data size before being stored on an HDD 3020 (naturally, job files in a complete queue are compressed). The arrangement of the image processing apparatus is practical because a user can spool many job files without considering the file size, even when a job is for a comparatively large file, such as a TIFF or an EPS. The threshold value for a file size, which determines whether or not a job file is to be compressed, can be arbitrarily altered by a user in consonance with the capacity of the HDD 3020 that is built into the system.

Figure 10:
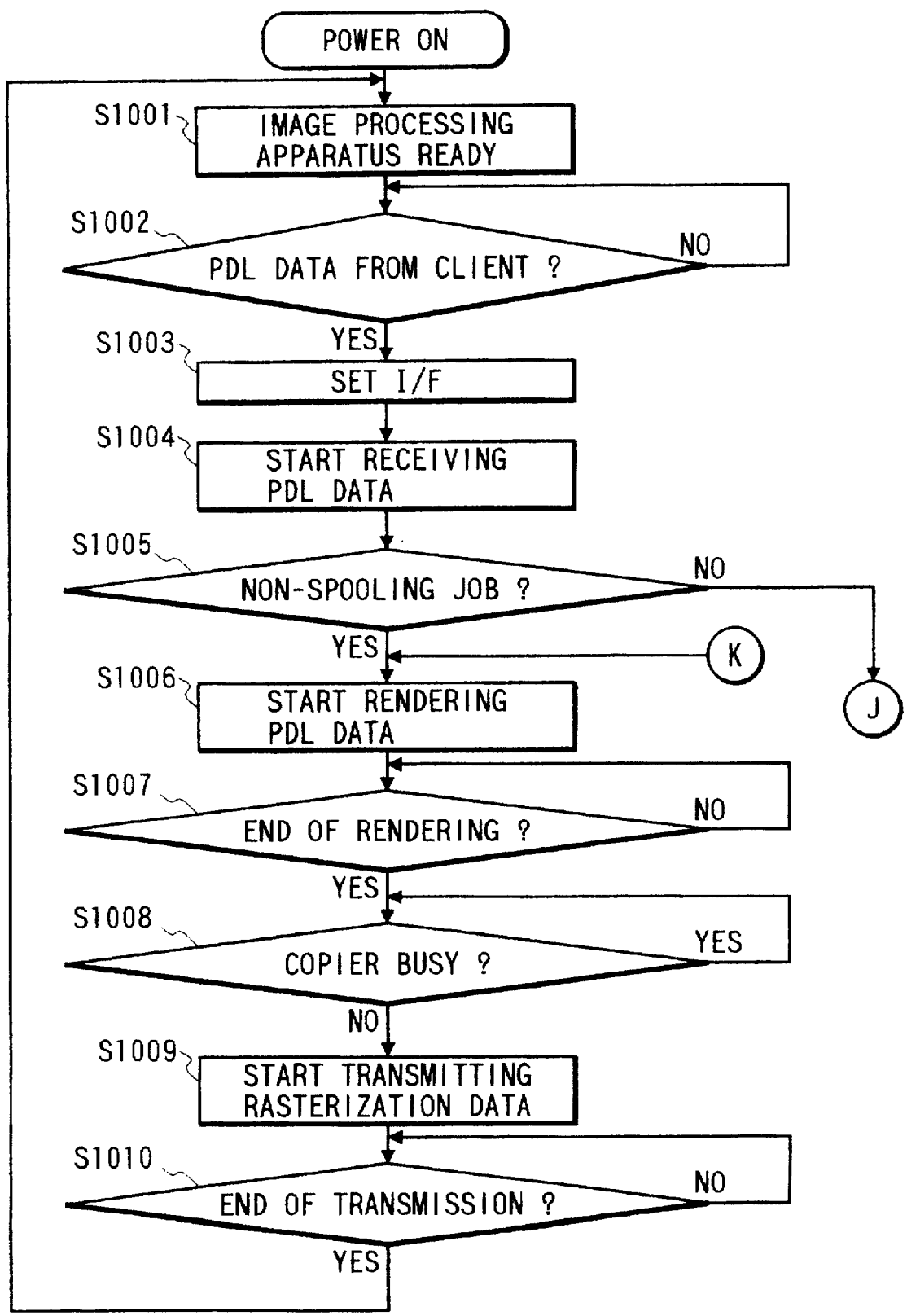
FIG. 10 is a flowchart for explaining the control exercised by an image processing apparatus according to a third embodiment.
Figure 11:
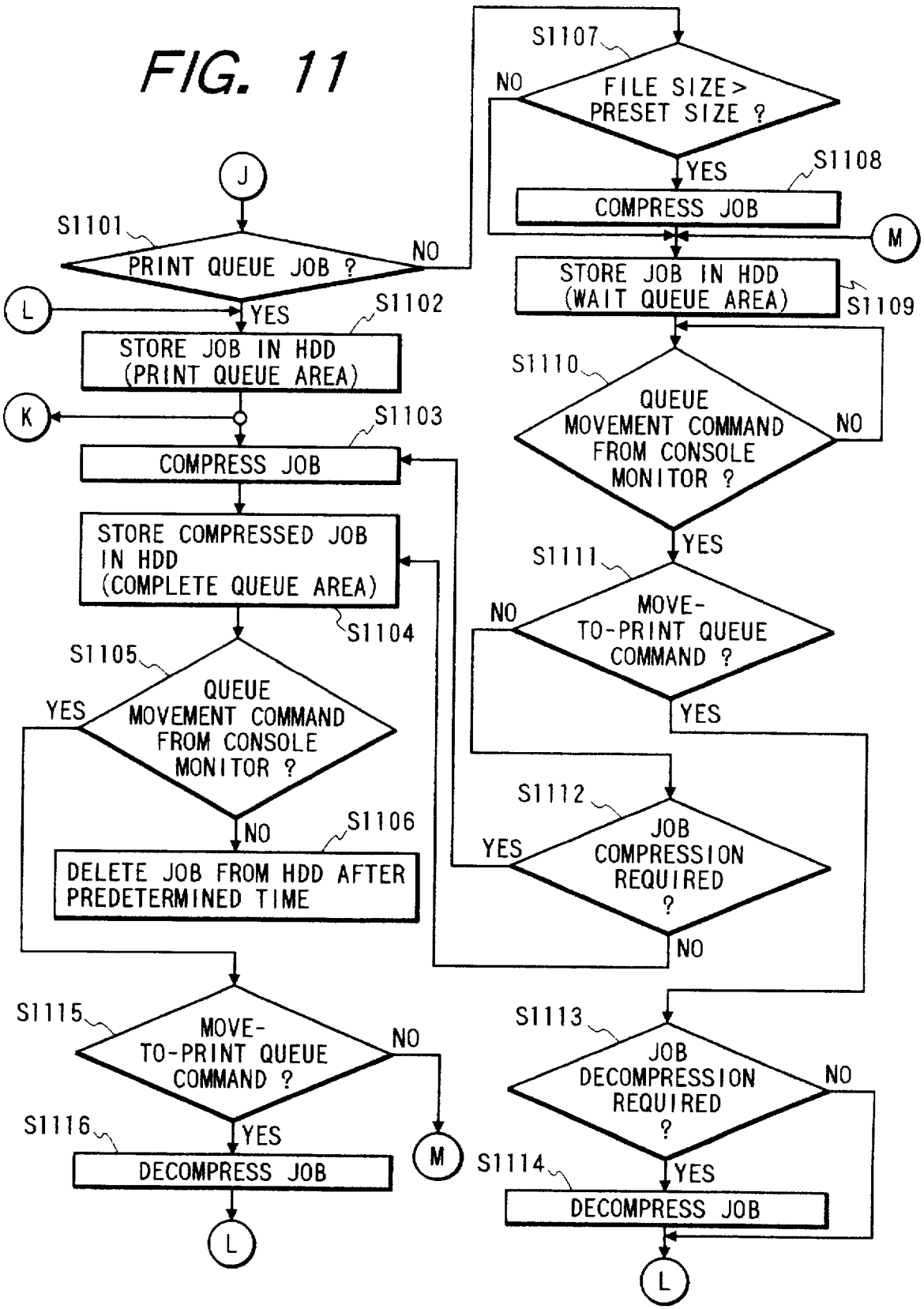
FIG. 11 is a flowchart for explaining the control exercised by the image processing apparatus according to the third embodiment.

FIGS. 10 and 11 are flowcharts of the control program for the image processing apparatus 110 according to this embodiment. First at step S1001 it is determined that the image processing apparatus is ready, and, at step S1002, a check is performed to determine whether or not PDL data are to be transmitted by a host computer. If they are, the image processing apparatus 110 waits until the PDL data are received. When the PDL data from the host computer are received, the interface to which the data are not transmitted is set to busy to inhibit the acceptance of data at that interface, and transmission of a notice to that effect is performed (S1003). At step S1004, reception of the PDL data is begun. It is preferable that the PDL data be received as units, such as sets of several bytes or several bands, that are appropriate for the image forming process in the color copier. At step S1005, a check is performed to determine whether or not the received PDL data are for a job for a non-spooling channel (directly connected without passing through a spooler). If the PDL data are for a non-spooling job, rasterization (rendering) of the PDL data received at steps S1006 and S1007 is performed, and the resultant data are written into the image memory in the image processing apparatus. The image memory can be either the DRAM 3013, which has a short access time, or the built-in HDD 3020, which has a longer access time but provides a large memory capacity at a lower cost. The selection of the image memory depends on the overall performance of the system and the capacity of the DRAM or the installed disk. At step S1008, by serial communication between the image processing apparatus 110 and the color copier 120, a check is performed to determine whether or not the copier 120 is busy. If the color copier 120 is not busy, the raster image data that have been developed in the image memory are read and transferred to the color copier 120 (S1009), and the color copier 120 forms an image for one page. If the color copier 120 is busy, the image processing apparatus 110 waits until the copier 120 is ready. When it is confirmed that the copier 120 is ready, the raster image data are transferred thereto. After the raster image data have been transferred, the image processing apparatus 110 is shifted to the ready state (S1001), placed on standby for the receipt of PDL data.

When, at step S1005, the PDL data received are not for a non-spooling job, i.e., are for a job employing a spooler, at step S1101, a check is performed to determine whether or not the PDL data are for a print queue job. If the PDL data are for a print queue job, at step S1102 the job is temporarily stored in an area, on the HDD 3020 in the image processing apparatus 110, that is allocated for a print queue. At steps S1006 through S1010, rasterization of the PDL data read from the HDD 3020 is performed; the state of the color copier 120 is checked to determine whether it is busy; the raster image data are transferred to the copier 120; and an image for one page is formed by the color copier 120. When the raster image data have been transferred, the image processing apparatus 110 is shifted to the ready state (S1001) to wait for PDL data. At this time, while the printing process is being performed at S1006 through S1010, at step S1103 the PDL data are compressed, and at step S1104 the compressed data are stored in an area, on the HDD 3020 in the image processing apparatus 110, that is allocated for a complete queue. Following this, at step S1105, a check is performed to determine whether or not a queue movement command has been issued by console monitor means, which may issue a command for monitoring a spooled job or for performing a queue movement. If no queue movement command has been issued by the console monitor means, at step S1106 the job is deleted after a predetermined time has elapsed. This predetermined time is a parameter that a user can arbitrarily set in accordance with available information, such as the capacity of the built-in HDD 3020. When a queue movement command has been issued, at step S1115 a check is performed to determine whether or not the command is a move-to-print queue command. If it is, at step S1116 the compressed PDL data are decompressed. Then, the decompressed PDL data job is temporarily stored in the area, on the HDD 3020 in the image processing apparatus 110, that is allocated for a print queue; rasterization of the PDL data stored on the HDD 3020 is performed; and an image is formed by the color copier 120. The succeeding process is the same as is described above. When, at step S1115, the command is not a move-to-print queue command, the processing at step S1009 and the following steps, which will be described later, are performed.

When, at step S1101, the job is not a print queue job, i.e., a wait queue job, at step S1107 a check is performed to determine whether or not the size of the PDL data file is greater than the size that is set as a threshold value for compression. If the size of the PDL data file is greater than the threshold value, at step S1108 the PDL data are compressed. If the size of the PDL data file is not greater, at step S1107 the PDL data are stored in an area, on the HDD 3020 in the image processing apparatus 110, that is allocated for a wait queue. The threshold value for compression of PDL data is a parameter that a user can freely alter or set in consonance with the capacity of the HDD 3020 that is built into the system. The size of the PDL data is determined when the PDL data are stored in the PDL buffer in the frame memory 3013 in FIG. 3. Subsequently, at step S1110, a check is performed to determine whether or not a queue movement command has been issued by the console monitor means, which may issue a command for monitoring a spooled job or for performing a queue movement. If a queue movement command has been issued, at step S1111 a check is performed to determine whether or not the command is a move-to-print queue command. If the command is a move-to-print queue command, at step S1113, a check is performed to determine whether or not the PDL data should be decompressed. If decompression is required, at step S1114 the PDL data are decompressed, and the decompressed PDL data are temporarily stored in the area, on the HDD 3020 in the image processing apparatus 110, that is allocated for a print queue. If decompression is not required, the PDL data are not changed and are temporarily stored in the area, on the HDD 3020 in the image processing apparatus 110, that is allocated for a print queue. In both cases, the succeeding processing that has been described above is performed.

When, at step S1111, the command is not a move-to-print queue command, i.e., when it is a move-to-complete queue command, at step S1112 a check is performed to determine whether or not compression of the job is required. If data compression is required, at step S1103 the PDL data are compressed, and the compressed PDL data are stored in the area, on the HDD 3020 in the image processing apparatus 110, that is allocated for a complete queue. If compression is not required, the PDL data are not changed and are stored in the area, on the HDD 3020 in the image processing apparatus 110, that is allocated for a complete queue. In both cases, the succeeding processing that has been described above is performed.

As is described above in detail, according to the present invention, it is possible to provide an image processing apparatus that can selectively compress image data in consonance with the instructions issued by a user, with a length of a period spent in a storage device, or with the size of an input image file in order to spool image data, and to provide an image processing method therefor.

In addition, as described above, according to the present invention, it is possible to provide an image processing method whereby a job file is compressed and the compressed data are stored in a storage device, such as on a hard disk, so that a large quantity of high resolution image data can be spooled by using a hard disk having a small memory capacity, and to provide an image processing apparatus and an image processing system therefor.

As is described above in detail, according to the present invention, it is possible to provide an image processing apparatus, and an image processing method comprising:

a compression step of compressing input image information;

a storage step of storing compressed image information in first storage means;

a processing step of processing the compressed image information stored in the first storage means; and a development step of developing the compressed image information into image data for individual pixels.

Further, according to the present invention, it is possible to provide an image processing apparatus, and an image processing method comprising:

a storage step of storing input image information in first storage means;

a measurement step of measuring a time that has elapsed following the storage of the image information in the first storage means;

a compression step of compressing the image information stored in the first storage means when at the measurement step a specified time has elapsed;

a processing step of processing compressed image information stored in the first storage means; and a development step of developing the compressed image information into image data for individual pixels.

In addition, according to the present invention, it is possible to provide an image processing apparatus, and an image processing method comprising:

an input step of inputting image information;

an examination step of examining the image information that is input;

a compression step of compressing the image information in consonance with a result obtained at the examination step;

a storage step of storing compressed image information in first storage means; and a processing step of processing compressed image information stored in the first storage means.

What is claimed is:

1. An image processing apparatus comprising:

determination means for determining whether image information is to be placed in an output queue for spooling, to be placed in a wait queue for spooling, or to be output without spooling; and control means for compressing the image information and storing the compressed image information in the wait queue if said determination means determines that the image information is to be placed in the wait queue for spooling.

2. The apparatus according to claim 1, wherein said control means stores the image information in the output queue and outputs the stored image information if said determination means determines that the image information is to be placed in the output queue for spooling.

3. The apparatus according to claim 1, wherein said control means outputs the image information if said determination means determines that the image information is to be output without spooling.

4. The apparatus according to claim 2, wherein said control means further compresses the output image information and stores the compressed image information in a complete queue.

5. The apparatus according to claim 1, wherein said control means controls movement of the image information stored in the wait queue to the output queue.

6. The apparatus according to claim 1, wherein said control means moves the image information stored in the wait queue to a complete queue after a predetermined time.

7. An image processing apparatus comprising:

determination means for determining whether image information is to be placed in an output queue for spooling, to be placed in a wait queue for spooling, or to be output without spooling;

control means for compressing the image information and storing the compressed image information in the wait queue if said determination means determines that the image information is to be placed in the wait queue for spooling; and output means for outputting information based on the image information stored in the wait queue.

8. The apparatus according to claim 7, wherein said control means stores the image information in the output queue and outputs the stored image information if said determination means determines that the image information is to be placed in the output queue for spooling.

9. The apparatus according to claim 7, wherein said control means outputs the image information if said determination means determines that the image information is to be output without spooling.

13

10. The apparatus according to claim 8, wherein said control means further compresses the output image information and stores the compressed image information in a complete queue.

11. The apparatus according to claim 7, wherein said control means controls movement of the image information stored in the wait queue to the output queue.

12. The apparatus according to claim 7, wherein said control means moves the image information stored in the wait queue to a complete queue after a predetermined time.

13. An image processing method comprising:
- a determination step of determining whether image information is to be placed in an output queue for spooling, to be placed in a wait queue for spooling, or to be output without spooling; and
- a control step of compressing the image information and storing the compressed image information in the wait queue if said determination step determines that the image information is to be placed in the wait queue for spooling.

14. The method according to claim 13, wherein said control step stores the image information in the output queue and outputs the stored image information if said determination step determines that the image information is to be placed in the output queue for spooling.

15. The method according to claim 15, wherein said control step outputs the image information if said determination step determines that the image information is to be output without spooling.

16. The method according to claim 14, wherein said control step further compresses the output image information and stores the compressed image information in a complete queue.

17. The method according to claim 13, wherein said controls step controls movement of the image information stored in the wait queue to the output queue.

18. The method according to claim 13, wherein said control step moves the image information stored in the wait queue to a complete queue after a predetermined time.

19. An image processing method comprising:
- a determination step of determining whether image information is to be placed in an output queue for spooling, to be placed in a wait queue for spooling, or to be output without spooling;
- a control step of compressing the image information and storing the compressed image information in the wait queue if said determination step determines that the image information is to be placed in the wait queue for spooling; and
- an output step of outputting information based on the image information stored in the wait queue.

20. The method according to claim 19, wherein said control step stores the image information in the output queue and outputs the stored image information if said determination step determines that the image information is to be placed in the output queue for spooling.

21. The method according to claim 19, wherein said control step outputs the image information if said determination step determines that the image information is to be output without spooling.

22. The method according to claim 20, wherein said control step further compresses the output image information and stores the compressed image information in a complete queue.

23. The method according to claim 19, wherein said control step controls movement of the mane information stored in the wait queue to the output queue.

14

24. The method according to claim 19, wherein said control step moves the image information stored in the wait queue to a complete queue after a predetermined time.

25. A computer readable medium having recorded thereon codes for implementing a computer implementable method of image processing comprising:
- a determination step of determining whether image information is to be placed in an output queue for spooling, to be placed in a wait queue for spooling, or to be output without spooling; and
- a control step of compressing the image information and storing the compressed image information in the wait queue if said determination means determines that the image information is to be placed in the wait queue for spooling.

26. The medium according to claim 25, wherein said control step stores the image information in the output queue and outputs the stored image information if said determination means determines that the image information is to be placed in the output queue for spooling.

27. The medium according to claim 25, wherein said control step outputs the image information if said determination step determines that the image information is to be output without spooling.

28. The medium according to claim 26, wherein said control step further compresses the output image information and stores the compressed image information in a complete queue.

29. The medium according to claim 25, wherein said control step controls movement of the image information stored in the wait queue to the output queue.

30. The medium according to claim 25, wherein said control step moves the image information stored in the wait queue to a complete queue after a predetermined time.

31. A computer readable medium having recorded thereon codes for implementing a computer implementable method of image processing comprising:
- a determination step of determining whether image information is to be placed in an output queue for spooling, to be placed in a wait queue for spooling, or to be output without spooling;
- a control step of compressing the image information and storing the compressed image information in the wait queue if said determination means determines that the image information is to be placed in the wait queue for spooling; and
- an output step of outputting information based on the image information stored in the wait queue.

32. The medium according to claim 31, wherein said control step stores the image information in the output queue and outputs the stored image information if said determination step determines that the image information is to be placed in the output queue for spooling.

33. The medium according to claim 31, wherein said control step outputs the image information if said determination step determines that the image information is to be output without spooling.

34. The medium according to claim 32, wherein said control step further compresses the output image information and stores the compressed image information in a complete queue.

35. The medium according to claim 31, wherein said control step controls movement of the image information stored in the wait queue to the output queue.

36. The medium according to claim 31, wherein said control step moves the image information stored in the wait queue to a complete queue after a predetermined time.

* * * * *

UNITED STATES PATENT AND TRADEMARK OFFICE
CERTIFICATE OF CORRECTION

PATENT NO. : 5,894,545

DATED : April 13, 1999

INVENTOR(S) : SHIGENORI FUKUTA

It is certified that error appears in the above-identified patent and that said Letters Patent is hereby corrected as shown below:

COLUMN 13 line 66, "mane" should read --image--.

Signed and Sealed this

Fourth Day of January, 2000

Attest:

Attesting Officer

Acting Commissioner of Patents and Trademarks